United States Patent
De Leon et al.

(10) Patent No.: US 12,093,503 B2
(45) Date of Patent: Sep. 17, 2024

(54) PRESENTATION AND CONTROL OF USER INTERACTION WITH AN ICON-BASED USER INTERFACE ELEMENT

(71) Applicant: Capital One Services, LLC, McLean, VA (US)

(72) Inventors: Erik Jay Salazar De Leon, Richmond, VA (US); Thomas Dohan, II, Elmhurst, IL (US); Jason Ferrell, Glen Allen, VA (US); Albert Berger, Arlington, VA (US); Vivian Wang, McLean, VA (US); Jennifer L Ellison, New Kent, VA (US)

(73) Assignee: Capital One Services, LLC, McLean, VA (US)

( * ) Notice: Subject to any disclaimer, the term of this patent is extended or adjusted under 35 U.S.C. 154(b) by 124 days.

(21) Appl. No.: 17/652,030

(22) Filed: Feb. 22, 2022

(65) Prior Publication Data
US 2023/0266858 A1 Aug. 24, 2023

(51) Int. Cl.
*G06F 3/04817* (2022.01)
*G06F 11/34* (2006.01)
*H04L 67/10* (2022.01)

(52) U.S. Cl.
CPC ...... *G06F 3/04817* (2013.01); *G06F 11/3438* (2013.01); *H04L 67/10* (2013.01)

(58) Field of Classification Search
None
See application file for complete search history.

(56) References Cited

U.S. PATENT DOCUMENTS

| 5,040,131 | A  | * | 8/1991 | Torres | G06F 3/04817 715/810 |
| 5,754,179 | A  | * | 5/1998 | Hocker | G06F 3/0481 715/835 |
| 6,121,968 | A  | * | 9/2000 | Arcuri | G06F 3/0482 715/825 |
| 6,232,972 | B1 | * | 5/2001 | Arcuri | G06F 9/453 715/830 |

(Continued)

OTHER PUBLICATIONS

International Search Report and Written Opinion for Application No. PCT/US2023/060880, mailed on May 4, 2023, 9 Pages.

*Primary Examiner* — Ryan Barrett
(74) *Attorney, Agent, or Firm* — Harrity & Harrity, LLP (57) ABSTRACT

In some implementations, a system may identify one or more account identifiers associated with a user account and corresponding to one or more account types. The system may determine an action to perform if account information associated with the user account or with a particular account identifier satisfies a condition. The system may transmit, to a user device, user interface (UI) data associated with an icon-based UI element. The UI data indicates a rectangular-shaped element, of the icon-based UI element, associated with the particular account identifier, and an interactable icon, of the icon-based UI element, positioned within a bottom portion of the rectangular-shaped element. The interactable icon is representative of the action. The system may include receiving, from the user device, interaction data indicating an interaction, by a user of the user device, with the interactable icon. The system may perform the action based on receiving the interaction data.

20 Claims, 9 Drawing Sheets

(56) References Cited

U.S. PATENT DOCUMENTS

| | | | | |
|---|---|---|---|---|
| 8,560,447 | B1* | 10/2013 | Hinghole | G06Q 20/14 705/40 |
| 10,134,035 | B1* | 11/2018 | Bent, II | H04W 12/069 |
| 10,510,082 | B1* | 12/2019 | Zimmerman | G06Q 20/108 |
| 11,232,436 | B1* | 1/2022 | Kelley | G06Q 20/354 |
| 11,386,223 | B1* | 7/2022 | Fakhraie | G06F 9/547 |
| 2007/0162369 | A1* | 7/2007 | Hardison | G06Q 40/04 705/35 |
| 2007/0226650 | A1* | 9/2007 | Hintermeister | G06F 3/048 715/822 |
| 2009/0089176 | A1 | 4/2009 | McCabe | |
| 2009/0228822 | A1* | 9/2009 | Miyata | G03G 15/5016 715/771 |
| 2010/0017325 | A1* | 1/2010 | Scherpa | G06Q 20/10 705/35 |
| 2010/0076890 | A1* | 3/2010 | Low | G06Q 20/3267 705/44 |
| 2010/0082481 | A1 | 4/2010 | Lin et al. | |
| 2010/0125495 | A1* | 5/2010 | Smith | G06Q 20/3223 705/26.1 |
| 2013/0024377 | A1* | 1/2013 | Stong | G06Q 20/10 726/4 |
| 2013/0070643 | A1* | 3/2013 | Udou | H04L 41/20 370/254 |
| 2014/0067654 | A1* | 3/2014 | Hanson | G06Q 20/3223 705/39 |
| 2015/0127398 | A1* | 5/2015 | Hoen, IV | G06Q 40/12 705/7.13 |
| 2016/0117765 | A1* | 4/2016 | Koeppel | G06T 11/001 705/35 |
| 2016/0358162 | A1 | 12/2016 | Park et al. | |
| 2017/0083930 | A1* | 3/2017 | Nagaraj | G06Q 30/0207 |
| 2017/0168678 | A1* | 6/2017 | Bozovich, Jr. | G06F 3/0484 |
| 2019/0095898 | A1* | 3/2019 | Bhatia | G06Q 20/227 |
| 2019/0332246 | A1* | 10/2019 | Pankaj | G06F 21/31 |
| 2020/0045519 | A1* | 2/2020 | Raleigh | H04M 15/765 |
| 2020/0074452 | A1 | 3/2020 | Healy et al. | |
| 2020/0302517 | A1* | 9/2020 | Van Os | G06F 3/0488 |
| 2020/0364785 | A1* | 11/2020 | Olson | G06Q 20/102 |
| 2021/0318799 | A1* | 10/2021 | Oh | G06F 21/84 |
| 2021/0373744 | A1* | 12/2021 | Miller | G06Q 20/363 |
| 2022/0240066 | A1* | 7/2022 | Raleigh | H04W 4/24 |
| 2022/0276778 | A1* | 9/2022 | Oh | G06F 21/84 |
| 2023/0245095 | A1* | 8/2023 | Kitsis | G06Q 20/3676 705/41 |
| 2023/0251772 | A1* | 8/2023 | Soccorsy | G06F 3/04883 715/810 |
| 2023/0341995 | A1* | 10/2023 | De Leon | G06F 3/0482 |

* cited by examiner

PRESENTATION AND CONTROL OF USER INTERACTION WITH AN ICON-BASED USER INTERFACE ELEMENT

BACKGROUND

A display of a user device may display a user interface (e.g., a graphical user interface). A user interface may permit interactions between a user of the user device and the user device. In some cases, the user may interact with the user interface to operate and/or control the user device to produce a desired result. For example, the user may interact with the user interface of the user device to cause the user device to perform an action. Additionally, the user interface may provide information to the user.

SUMMARY

Some implementations described herein relate to a system for providing data for presentation of an icon-based user interface element. The system may include one or more memories and one or more processors communicatively coupled to the one or more memories. The one or more processors may be configured to identify, based on a user identifier associated with a user account, one or more account identifiers associated with the user identifier, wherein the one or more account identifiers correspond to one or more account types. The one or more processors may be configured to determine an action to perform if account information associated with the user account or with a particular account identifier, of the one or more account identifiers, satisfies a condition. The one or more processors may be configured to transmit, to a user device, user interface data associated with the icon-based user interface element, wherein the user interface data indicates a rectangular-shaped element, of the icon-based user interface element, associated with the particular account identifier, and an interactable icon, of the icon-based user interface element, positioned within a bottom portion of the rectangular-shaped element, and wherein the interactable icon is representative of the action. The one or more processors may be configured to receive, from the user device, interaction data indicating an interaction, by a user of the user device, with the interactable icon. The one or more processors may be configured to perform the action based on receiving the interaction data.

Some implementations described herein relate to a method for providing data for presenting an icon-based user interface element. The method may include identifying, by a system, a plurality of account identifiers associated with a user account of a user. The method may include determining, by the system, a primary account identifier, of the plurality of account identifiers, that has an importance level greater than respective importance levels of other account identifiers, of the plurality of account identifiers, based on one or more factors. The method may include determining, by the system, an action to perform if account information associated with the user account or with the primary account identifier satisfies a condition. The method may include transmitting, by the system and to a user device, a first set of user interface data indicating a plurality of user interface elements corresponding to the plurality of account identifiers, wherein a primary user interface element, of the plurality of user interface elements, corresponds to the primary account identifier, where the first set of user interface data indicates a rectangular-shaped element, of the primary user interface element, and an interactable icon positioned within a bottom portion of the rectangular-shaped element where the interactable icon is representative of the action.

Some implementations described herein relate to a user device configured to present an icon-based user interface element. The user device may include a memory and one or more processors communicatively coupled to the memory. The one or more processors may be configured to present, on a user interface associated with a user account, one or more interaction elements corresponding to one or more account identifiers associated with the user account. The one or more processors may be configured to detect a user interaction, with the user device, that indicates a selected interaction element of the one or more interaction elements, wherein the selected interaction element corresponds to a selected account identifier, of the one or more account identifiers, and with a selected account, of one or more accounts associated with the user account. The one or more processors may be configured to present, on the user interface and based on the user interaction, the icon-based user interface element, wherein the icon-based user interface element includes a rectangular-shaped element associated with the selected account identifier, wherein the icon-based user interface element includes an interactable icon within a bottom portion of the rectangular-shaped element, and wherein the interactable icon is representative of a first action, associated with the user account or the selected account, to be performed if account information associated with the user account or the selected account satisfies a condition.

DETAILED DESCRIPTION

The following detailed description of example implementations refers to the accompanying drawings. The same reference numbers in different drawings may identify the same or similar elements.

A user may have one or more accounts for which the user may want to periodically obtain account information (e.g., account balance, interaction history). To access the information, the user may log in to a particular one of the user's accounts or an overall user account under which the one or more accounts are sub-accounts (e.g., via an application installed on a user device of the user, such as a mobile phone, or via a web-based application). Additionally, at various points in time, a particular account may require a certain action (e.g., paying a balance associated with the account). To perform the action, the user often has to navigate through different user interfaces (UIs) and/or away from the account information that the user seeks to obtain before being able to select an option to perform the action. Such a process may be inconvenient to and/or inefficient for the user. Additionally, to generate and navigate the user through the different UIs utilizes computing resources. Thus, it is desirable for a UI to provide a user-friendly and efficient way to present account information to a user together with a function for the user to perform an action related to the account.

Some implementations described herein enable a system to provide data for presentation of a UI element on a user device that provides account information of a user's account in a similar view as an option to perform and/or initiate an action related to the user's account. The system may determine the action to perform if account information associated with the user's account satisfies a condition. The UI element may include a rectangular-shaped element associated with the user's account. The UI element may also include an interactable icon, which may be positioned within a bottom portion of the rectangular-shaped element. The interactable icon may be representative of the action.

In some implementations described herein, in scenarios in which the user may have an overall account with multiple sub-accounts, a system may determine a primary account of the multiple sub-accounts. The system may determine the action to perform for the primary account if information associated with the user's overall account and/or with the primary account satisfies a condition. The system may transmit a first set of UI data that indicates multiple UI elements corresponding to the multiple sub-accounts, where the UI element for the primary account (e.g., the primary UI element) is displayed first. The primary UI element may include a rectangular-shaped element associated with the primary account. The primary UI element may also include an interactable icon, which may be positioned within a bottom portion of the rectangular-shaped element. The interactable icon may be representative of the action.

In some implementations described herein, in scenarios in which the user may want to perform an action related to a sub-account other than the primary account, the system may receive data indicating a selection of the other sub-account. The system may determine an action to perform for the other sub-account if information associated with the user's overall account and/or with the other sub-account satisfies a condition. The system may transmit a second set of UI data that indicates the multiple UI elements corresponding to the multiple sub-accounts, where the UI element for the other sub-account is displayed first. The UI element may include a rectangular-shaped element associated with the other sub-account, and an interactable icon, which may be positioned within a bottom portion of the rectangular-shaped element. The interactable icon may be representative of the action.

By including an interactable icon within a rectangular-shaped element of a UI element as part of a single UI, the system and/or user device are able to provide account functions, together with relevant account information, in an efficient manner and format. As a result, the user does not have to navigate through multiple UIs and interact with multiple UI elements in order to request or perform a particular action associated with the account, and computing memory and resources are saved by reducing the number of UIs.

Figure 1A:
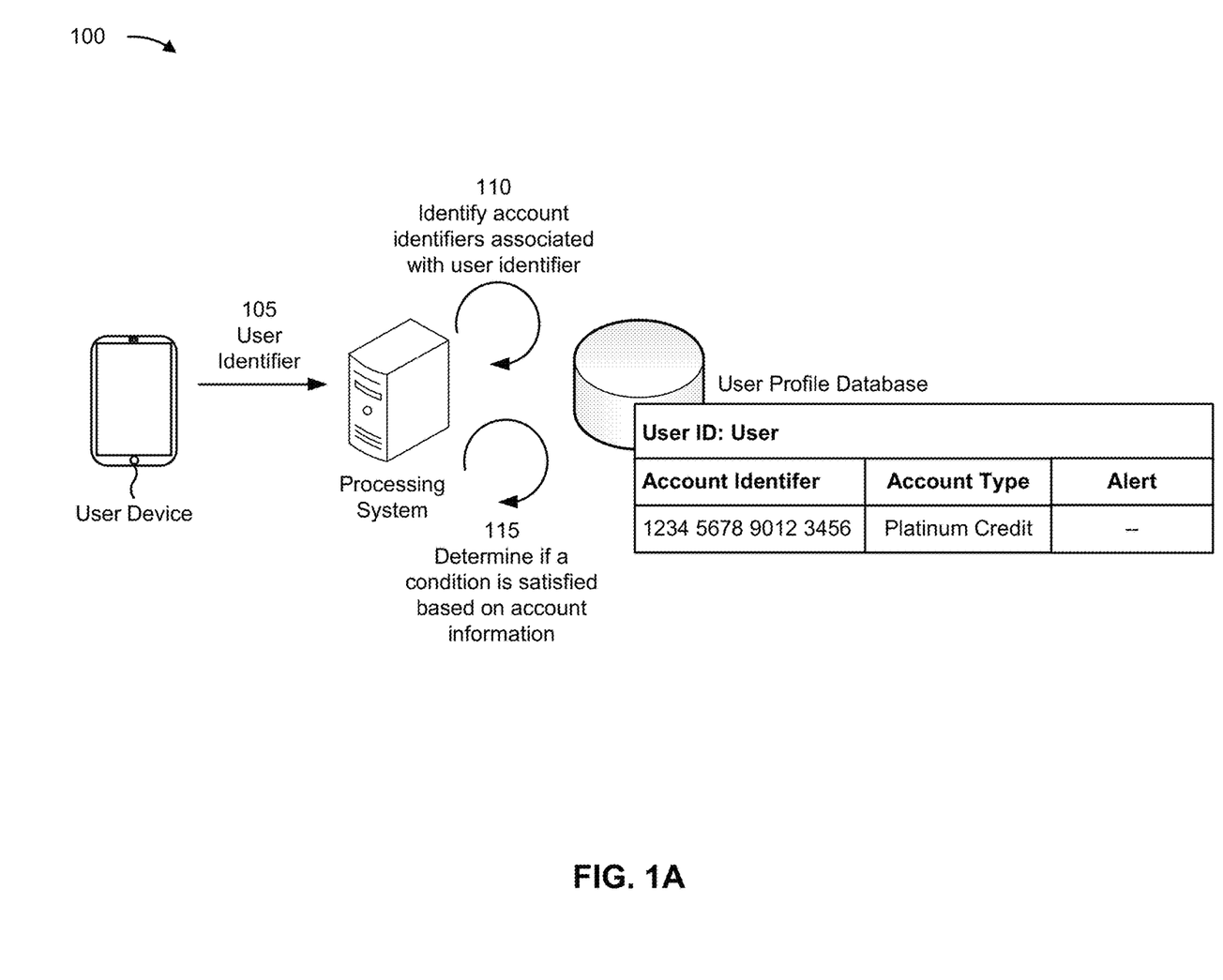
FIGS. 1A-1C are diagrams of an example implementation relating to presentation and control of user interaction with an icon-based user interface element.
Figure 1B:
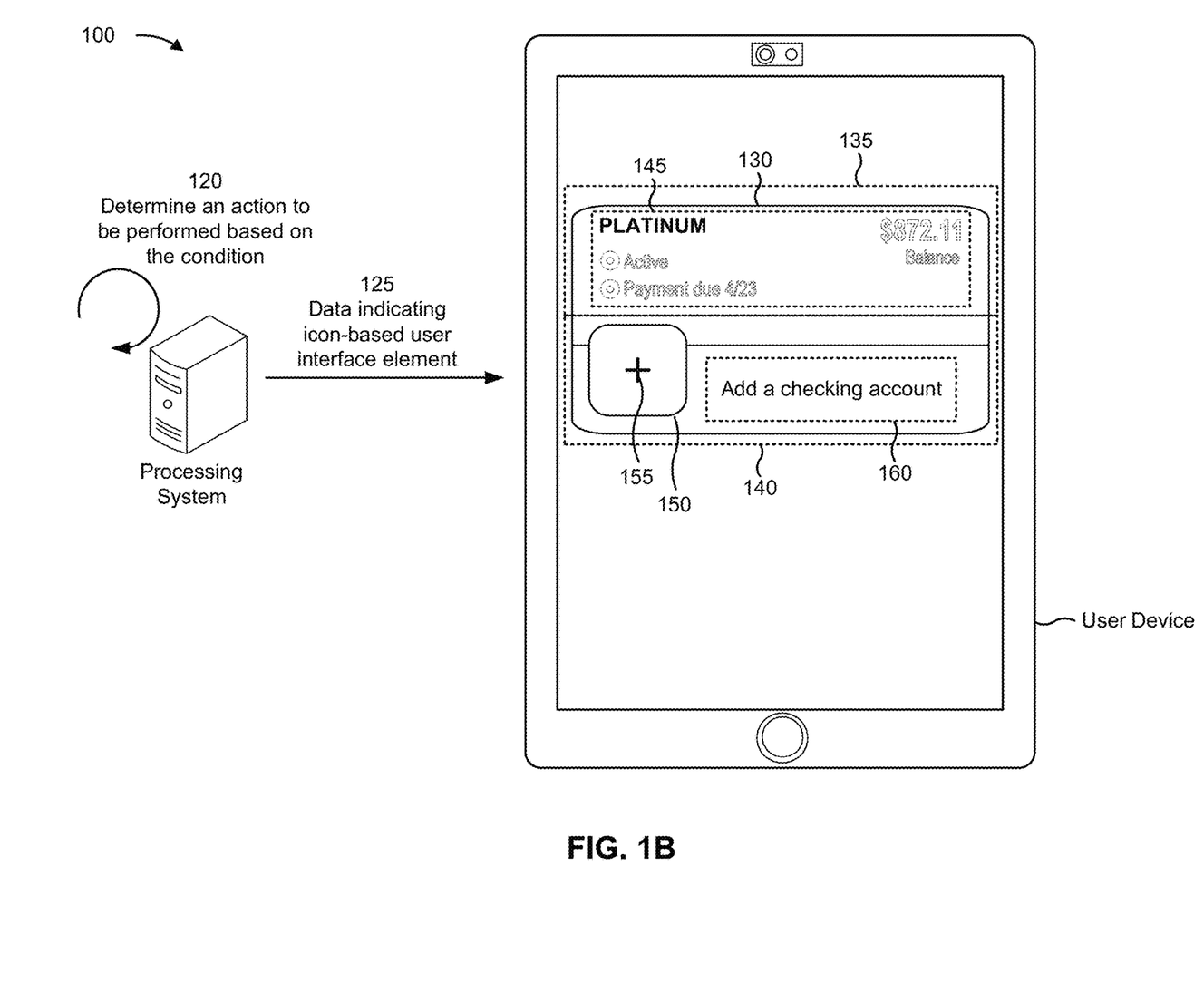
Figure 1C:
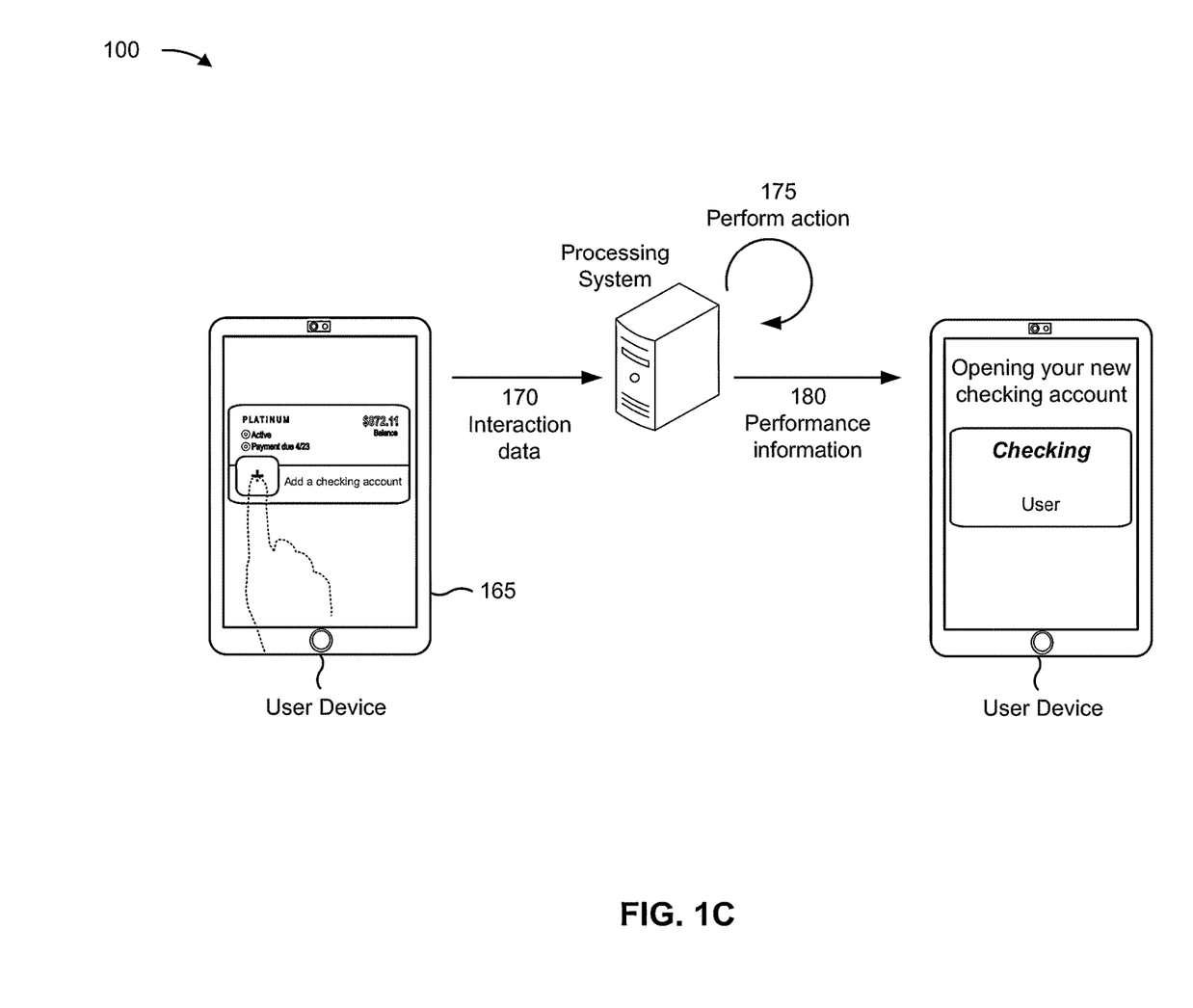

FIGS. 1A-1C are diagrams of an example 100 associated with presentation and control of user interaction with an icon-based UI element. As shown in FIGS. 1A-1C, example 100 includes a processing system, a user profile database, and a user device. These devices are described in more detail in connection with FIGS. 3 and 4.

As shown in FIG. 1A, a user may access an account of the user (e.g., a user account) via the user device, such as via an application installed on the user device or via a web-based application accessed on the user device. The user and user account may be associated with a user identifier (e.g., the user's login or screenname) by which the user and user account may be identified. As shown by reference number 105, the processing system may receive, from the user device, data indicating the user identifier, such as when the user logs into the user account via the application installed on the user device or via the web-based application.

As shown by reference number 110, based on receiving the user identifier from the user device, the processing system may identify (e.g., from a user profile database) one or more account identifiers (e.g., an account ID number, a primary account number (PAN), or a virtual card number) associated with the user identifier. Each account identifier may correspond to a different account (or sub-account) of the user account, and each of the different accounts (or sub-accounts) may be associated with a particular account type of multiple available account types (e.g., a checking account type, a credit account type, a savings account type, or a rewards account type). The account type may be associated with the particular account identifier in the user profile database.

As shown by reference number 115, the processing system may determine if a condition is satisfied based on account information associated with the user account or with a particular account identifier. For example, one condition may be that one or more available account types differ from the account type(s) corresponding to the one or more account identifiers associated with the user account (e.g., the user account is not associated with all of the available account types, and the user is able to sign up for an account associated with one or more differing available account types). To determine if this condition is satisfied, the processing system may identify, from the user profile database, the account type(s) corresponding to the one or more account identifiers associated with the user account, and then identify an available account type that differs from the identified account identifier(s).

As another example, another condition may be that one or more of the different accounts (or sub-accounts) of the user account have a required action (e.g., paying a balance, renewing an account, updating information, or submitting documentation) having an impending action date (e.g., a deadline date) within a threshold time frame (e.g., one month, 10 days, 3 days). Action data indicating the required action may be stored as account information in the user profile database under the associated account identifier. The processing system may determine that the user account has the required action by accessing the account information from the user profile database.

As another example, another condition may be that one or more of the account identifiers has an alert (e.g., fraud alert, overdraft alert, or late payment alert) associated with the particular account identifier. The account (or sub-account) corresponding to the particular account identifier may be flagged with the alert in the user profile database. The processing system may identify the alert by accessing the account information from the user profile database.

As shown in FIG. 1B and by reference number 120, if the processing system determines that a condition is satisfied, then the processing system may determine an action to be performed based on the condition. For example, where the condition relates to one or more available account types that differ from the identified account type(s), then the action may be to initiate a sign-up process for signing up the user for the available account type (or an account associated with the available account type), and transmitting, to the user device, sign-up information associated with the sign-up process. As another example, where the condition relates to a required action associated with one or more of the different accounts (or sub-accounts) of the user account, then the action may be to perform the required action (e.g., pay the balance, renew the account). As another example, where the condition relates to an alert (e.g., a fraud alert) associated with a particular account identifier, then the action may be to lock the account corresponding to the particular account identifier.

Based on the action determined by the processing system for a particular account identifier, the processing system may determine characteristics of the icon-based UI element for the particular account identifier. As shown by reference number 125, the processing system may transmit, to the user device, UI data indicating the icon-based UI element to be displayed on a display of the user device.

As shown in FIG. 1B, the icon-based UI element, as indicated by the UI data, may include a rectangular-shaped element 130. In some implementations, the rectangular-shaped element 130 may have rounded corners, as shown in FIG. 1B. Alternatively, the rectangular-shaped element 130 may have square corners or chamfered corners. The rectangular-shaped element 130 may be a visual representation of (e.g., have dimensions similar to) a physical, rectangular-shaped card (e.g., a transaction card) associated with the account identifier. For example, the rectangular-shaped element 130 may have a width that is greater than a height of the rectangular-shaped element 130. Additionally, the rectangular-shaped element 130 may include a top portion 135 and a bottom portion 140. The top portion 135 may be used to display account-specific information 145, such as an account status (e.g., active or inactive), an account balance, and/or a deadline date (e.g., to pay the account balance).

The icon-based UI element also may include an interactable icon 150, which may be positioned or located within the bottom portion 140 of the rectangular-shaped element 130. The interactable icon 150 may be representative of the particular action. In some implementations, the interactable icon 150 may include an icon graphic 155 and/or text associated with the particular action. For example, if the action is to add a new account, such as an account having a different account type, then the icon graphic 155 may include an image associated with addition (e.g., a plus symbol). As another example, if the action is to pay an account balance, then the icon graphic 155 may include an image associated with payment (e.g., a currency sign, a money bag, a bill, a stack of cash, or a cash register). As another example, if the action is to lock the account, then the icon graphic 155 may include an image associated with locking an item (e.g., a lock symbol). The icon-based UI element may further include action information 160 that may be descriptive of the particular action to be performed. As shown in FIG. 1B, the action information 160 also may be positioned within the bottom portion 140 of the rectangular-shaped element 130.

As shown in FIG. 1C, the user may interact with the icon-based UI element to initiate the particular action associated with the interactable icon. For example, as shown by reference number 165, the user may interact with the interactable icon (e.g., by pressing the interactable icon on a touchscreen display of the user device, or by selecting the interactable icon with a cursor). The user device may detect the user interaction with the interactable icon. As shown by reference number 170, the processing system may receive, from the user device, interaction data indicating the user's interaction with the interactable icon.

As shown by reference number 175, the processing system may perform the action or steps associated with the action (e.g., initiating a sign-up process for the user to sign up for a new account or available account type, paying a balance, renewing an account, or locking an account). As shown by reference number 180, the processing system may transmit, to the user device, performance information indicating details associated with performance of the action (e.g., confirmation of initiation and/or completion of the action). As shown in FIG. 1C, the user device may display the performance information.

Although implementations are described herein in connection with the icon-based UI element having a rectangular-shaped element, techniques described herein may be used for any shape (e.g., a circle, oval, square, or non-geometric shape). Additionally, or alternatively, although implementations are described herein in connection with the interactable icon being positioned within a bottom portion of the rectangular-shaped element, techniques described herein may be used for any position of the interactable icon within the rectangular-shaped element (or other shaped element), such as a top portion, a side portion, or central portion.

Using the techniques described herein, by including an interactable icon within a rectangular-shaped element of a UI element, the processing system and/or user device are able to efficiently provide account functions to the user in a single UI. As a result, the user does not have to navigate through multiple UIs and interact with multiple UI elements in order to request or perform a particular action associated with the account, and computing memory and resources are saved by reducing the number of UIs.

As indicated above, FIGS. 1A-1C are provided as an example. Other examples may differ from what is described with regard to FIGS. 1A-1C.

Figure 2A:
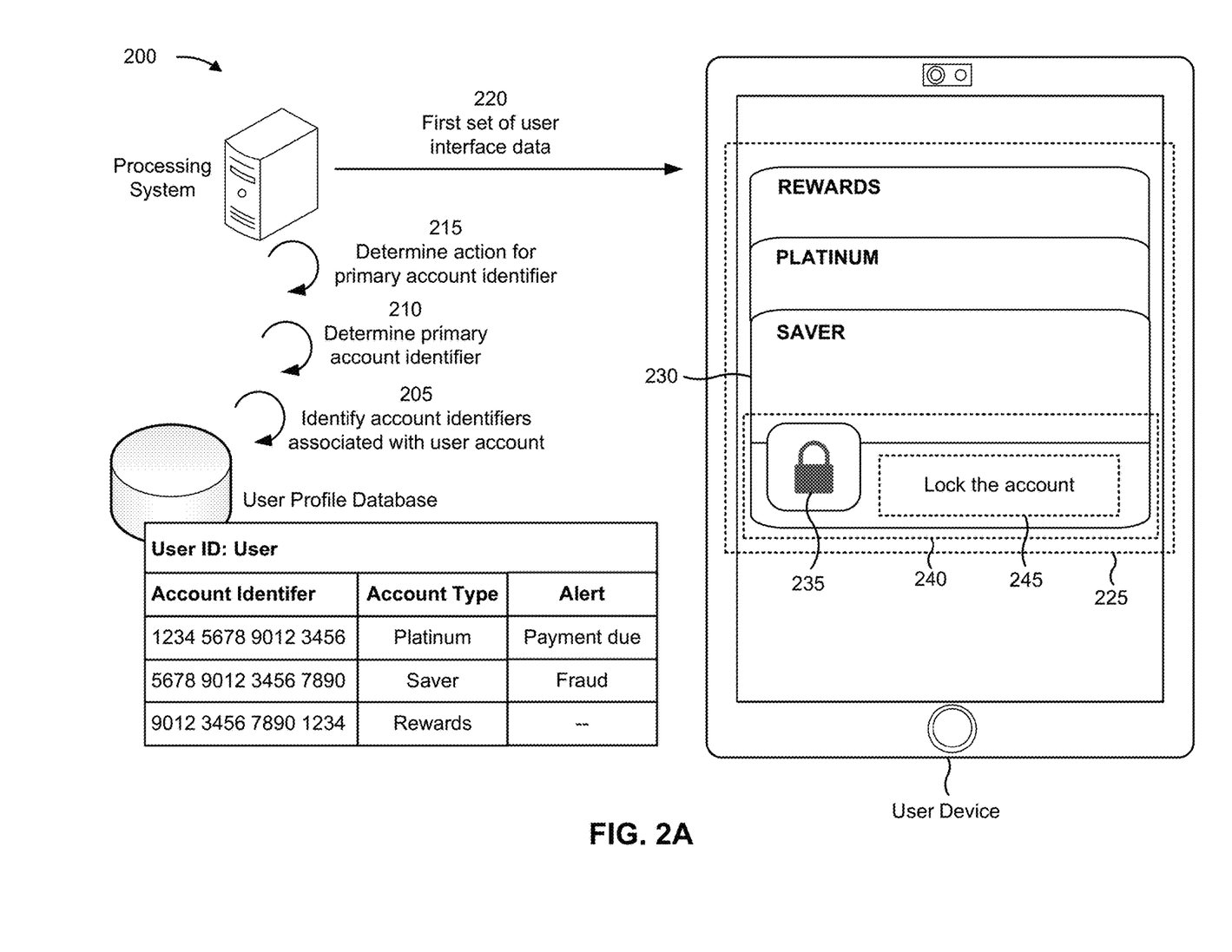
FIGS. 2A-2B are diagrams of an example implementation relating to presentation and control of user interaction with an icon-based user interface element.
Figure 2B:
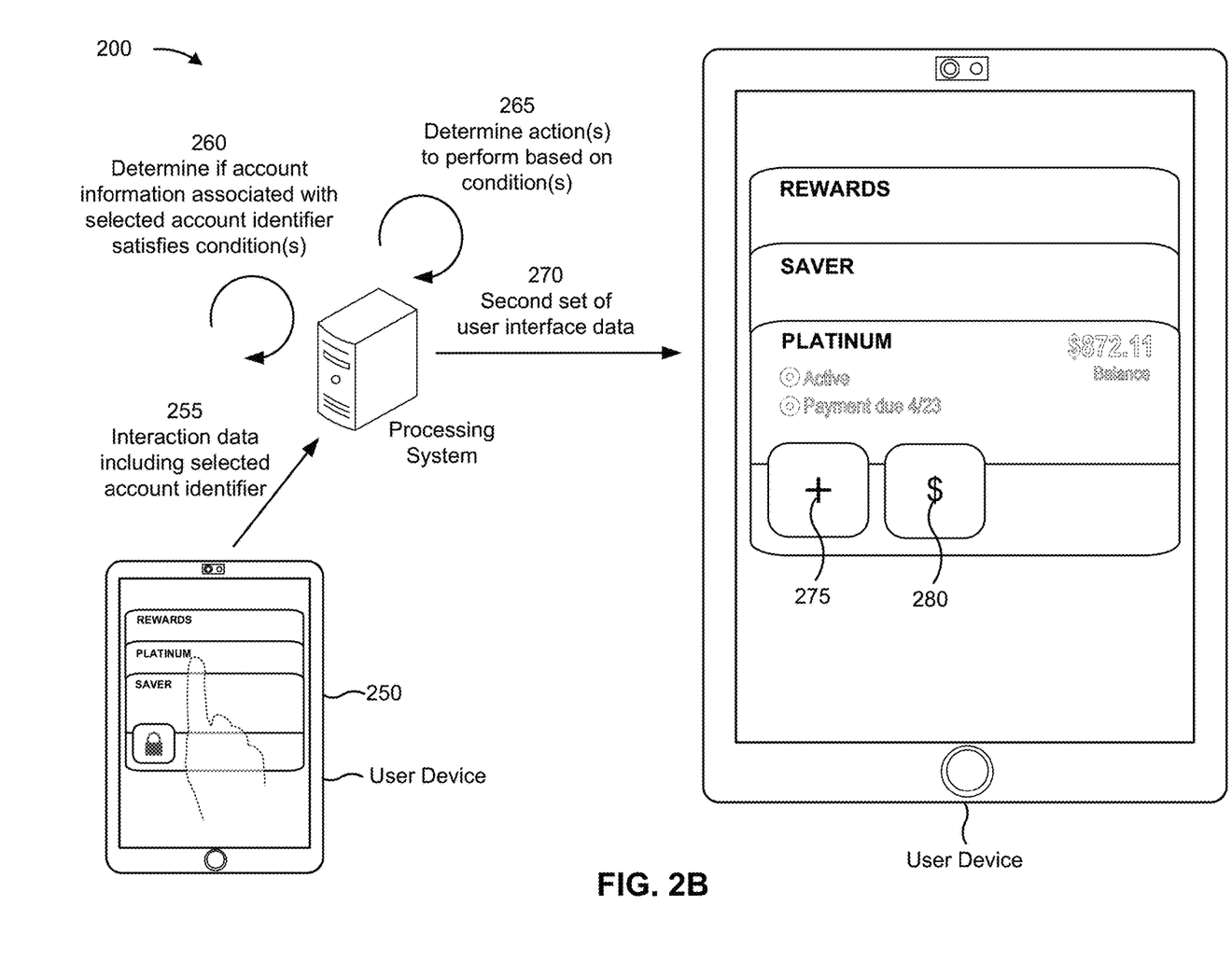

FIGS. 2A-2B are diagrams of an example 200 associated with presentation and control of user interaction with an icon-based UI element. As shown in FIGS. 2A-2B, example 100 includes a processing system, a user profile database, and a user device. These devices are described in more detail in connection with FIGS. 3 and 4.

As shown in FIG. 2A, a user may have multiple accounts associated with the user, each account having a unique account identifier (e.g., an account ID number, a PAN, or a virtual card number). As shown by reference number 205, after the processing system has received a user identifier (e.g., the user's screenname or login) from the user device (e.g., after the user has logged in to the user account via an application installed on the user device or via a web-based application accessed on the user device), the processing system may identify multiple account identifiers corresponding to the multiple accounts of the user. Each account identifier may correspond to a different account (or sub-account) of the user account, and each of the different accounts (or sub-accounts) may be associated with a particular account type of multiple available account types (e.g., a checking account type, a credit account type, a savings account type, or a rewards account type). The account type may be associated with the particular account identifier in the user profile database.

As shown by reference number 210, the processing system may determine a primary account identifier of the multiple account identifiers. The multiple account identifiers may each have an importance level (e.g., a rank), and the primary account identifier may be the account identifier associated with the greatest importance level. The range of importance levels may be based on the number of account identifiers associated with the user account. For example, if the user account has three account identifiers, then the greatest importance level may be three, the second importance level may be two, and the lowest importance level may be one. The importance levels may be based on one or more factors (e.g., alert, account balance, impending action date, or account type). Each factor may be assigned a particular weight. For example, an account identifier that has been flagged with an alert may receive a high weight (e.g., 5). As another example, an account identifier that has an action date (e.g., a payment date) within a threshold time frame may receive a certain weight. The weight may depend on the threshold time frame. For example, an action date in 2 days receives a high weight (e.g., 5), whereas an action date in 30 days receives a low weight (e.g., 1). As another example, the different available account types may be assigned different weights. For example, a credit account type may receive a high weight (e.g., 3), a checking account type may receive an intermediate weight (e.g., 2), and a rewards account type may receive a low weight (e.g., 1). The weights of all the factors for each account identifier may be totaled, and the importance level may be assigned in order of decreasing total (e.g., the account identifier with the highest total has the greatest importance level).

As shown by reference number 215, the processing system may determine an action to perform if account information associated with the user account or with the primary account identifier satisfies a condition. For example, if the processing system determines that one or more available account types differ from the account types of the account identifiers associated with the user account, then the action may be to initiate a sign-up process for signing up the user for the available account type (or an account associated with the available account type), and transmitting, to the user device, sign-up information associated with the sign-up process. As another example, if the processing system determines that the account associated with the primary account identifier has a required action within a threshold time frame, then the action may be to perform the required action (e.g., pay the balance, renew the account). As another example, if the processing system identifies an alert (e.g., a fraud alert) associated with the primary account identifier, then the action may be to lock the account corresponding to the primary account identifier.

Based on the determination of the importance levels, including identifying the primary account identifier, and the action associated with the primary account identifier, the processing system may determine characteristics of the icon-based UI element, as described in more detail below. As shown by reference number 220, the processing system may transmit, to the user device, a first set of UI data indicating the icon-based UI element to be displayed on a display of the user device.

As shown in FIG. 2A, the first set of UI data may indicate multiple UI elements (e.g., arranged in a stack) corresponding to the multiple account identifiers associated with the user account. The UI elements may be arranged in an order of importance level, where a primary one of the UI elements (e.g., a primary UI element) corresponding to the primary account identifier is displayed first (e.g., at the bottom of the stack). The primary UI element, as indicated by the first set of user interface data, may include a rectangular-shaped element 230, and an interactable icon 235, which may be positioned within a bottom portion 240 of the rectangular-shaped element 230.

The interactable icon 235 may be representative of the particular action. In some implementations, the interactable icon 235 may include an icon graphic and/or text associated with the particular action. For example, if the action is to add a new account, such as an account having a different account type, then the icon graphic may include an image associated with addition (e.g., a plus symbol). As another example, if the action is to pay an account balance, then the icon graphic 155 may include an image associated with payment (e.g., a currency sign, a money bag, a bill, a stack of cash, or a cash register). As another example, if the action is to lock the account, then the icon graphic may include an image associated with locking an item (e.g., a lock). The first set of UI data may further indicate action information 245 that may be descriptive of the particular action to be performed. As shown in FIG. 2A, the action information 245 also may be positioned within the bottom portion 240 of the rectangular-shaped element 230.

As shown in FIG. 2B, the user may choose a different account identifier for which to have an action or actions displayed. For example, as shown by reference number 250, the user may select one of the other (e.g., non-primary) UI elements (e.g., by pressing the particular UI element on a touchscreen of the user device). As shown by reference number 255, the processing system may receive, from the user device, interaction data indicating the selected UI element. As shown by reference number 260, the processing system may determine if account information associated with account identifier corresponding to the selected UI element (e.g., the selected account identifier) satisfies one or more conditions. As shown by reference number 265, the processing system may determine one or more actions to perform based on the condition(s). For example, where the condition relates to one or more available account types that differ from the identified account type(s), then the action may be to initiate a sign-up process for signing up the user for the available account type (or an account associated with the available account type), and transmitting, to the user device, sign-up information associated with the sign-up process. As another example, where the condition relates to a required action associated with one or more of the different accounts (or sub-accounts) of the user account, then the action may be to perform the required action (e.g., pay the balance, renew the account). As another example, where the condition relates to an alert (e.g., a fraud alert) associated with a particular account identifier, then the action may be to lock the account corresponding to the particular account identifier.

As shown by reference number 270, the processing system may transmit, to the user device, a second set of user interface data indicating updated characteristics of the icon-based UI element (e.g., based on the selection of the other account identifier). As shown in FIG. 2B, the second set of UI data may indicate multiple UI elements (e.g., arranged in a stack) corresponding to the multiple account identifiers associated with the user account, with the UI element corresponding to the selected account identifier displayed first (e.g., at the bottom of the stack) and the remaining UI elements arranged in order of order of importance level. The UI element corresponding to the selected account identifier, as indicated by the second set of user interface data, may include a rectangular-shaped element and an interactable icon, which may be positioned within a bottom portion of the rectangular-shaped element.

As shown in FIG. 2B, in some implementations, if the processing system determines more than one action associated with an account identifier, the UI element displayed first (e.g., at the bottom of the stack) may include an interactable icon for each action. For example, if the processing system determines an action to add an account and to pay a balance for the account corresponding to the selected account identifier, then the corresponding UI element may include interactable icons 275 and 280 within the bottom portion of the rectangular-shaped element.

Although implementations are described herein in connection with the icon-based UI element having a rectangular-shaped element, techniques described herein may be used for any shape (e.g., a circle, oval, square, or non-geometric shape). Additionally, or alternatively, although implementations are described herein in connection with the interactable icon being positioned within a bottom portion of the rectangular-shaped element, techniques described herein may be used for any position of the interactable icon within the rectangular-shaped element (or other shaped element), such as a top portion, a side portion, or central portion.

Using the techniques described herein, by including an interactable icon within a rectangular-shaped element of a UI element, the processing system and/or user device are able to efficiently provide account functions to the user in a single UI. As a result, the user does not have to navigate through multiple UIs and interact with multiple UI elements in order to request or perform a particular action associated with the account, and computing memory and resources are saved by reducing the number of UIs.

As indicated above, FIGS. 2A-2B are provided as an example. Other examples may differ from what is described with regard to FIGS. 2A-2B.

Figure 3:
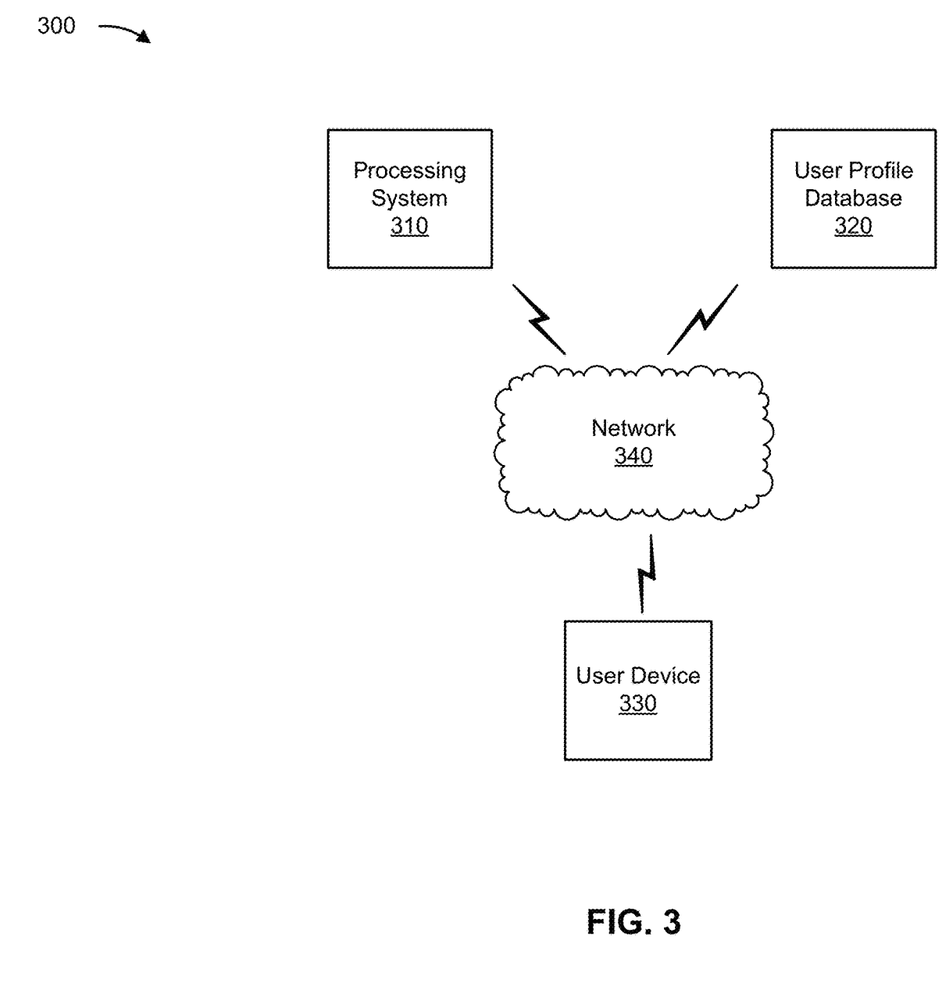
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a processing system 310, a user profile database 320, a user device 330, and a network 340. Devices of environment 300 may interconnect via wired connections, wireless connections, or a combination of wired and wireless connections.

The processing system 310 includes one or more devices capable of receiving, generating, storing, processing, providing, and/or routing information associated with presentation and control of user interaction with an icon-based user interface element, as described elsewhere herein. The processing system 310 may include a communication device and/or a computing device. For example, the processing system 310 may include a server, such as an application server, a client server, a web server, a database server, a host server, a proxy server, a virtual server (e.g., executing on computing hardware), or a server in a cloud computing system. In some implementations, the processing system 310 includes computing hardware used in a cloud computing environment.

The user profile database 320 includes one or more devices capable of receiving, generating, storing, processing, and/or providing information associated with presentation and control of user interaction with an icon-based user interface element, as described elsewhere herein. The user profile database 320 may include a communication device and/or a computing device. For example, the user profile database 320 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the user profile database 320 may store information associated with an account of a user, as described elsewhere herein.

The user device 330 includes one or more devices capable of receiving, generating, storing, processing, and/or providing information associated with presentation and control of user interaction with an icon-based user interface element, as described elsewhere herein. The user device 330 may include a communication device and/or a computing device. For example, the user device 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The network 340 includes one or more wired and/or wireless networks. For example, the network 340 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 340 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
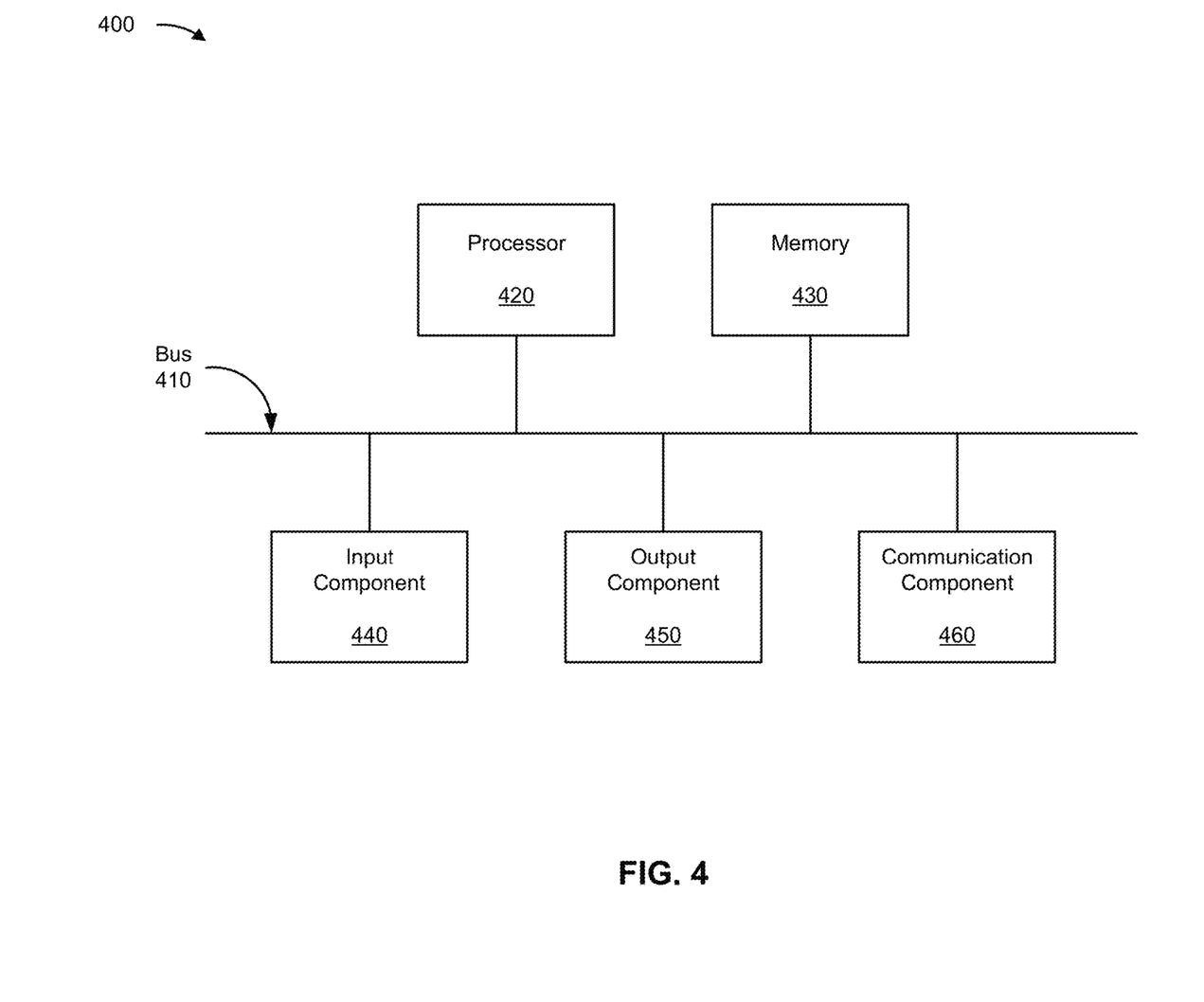
FIG. 4 is a diagram of example components of one or more devices of FIG. 3.

FIG. 4 is a diagram of example components of a device 400, which may correspond to processing system 310, user profile database 320, and/or user device 330. In some implementations, processing system 310, user profile database 320, and/or user device 330 include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
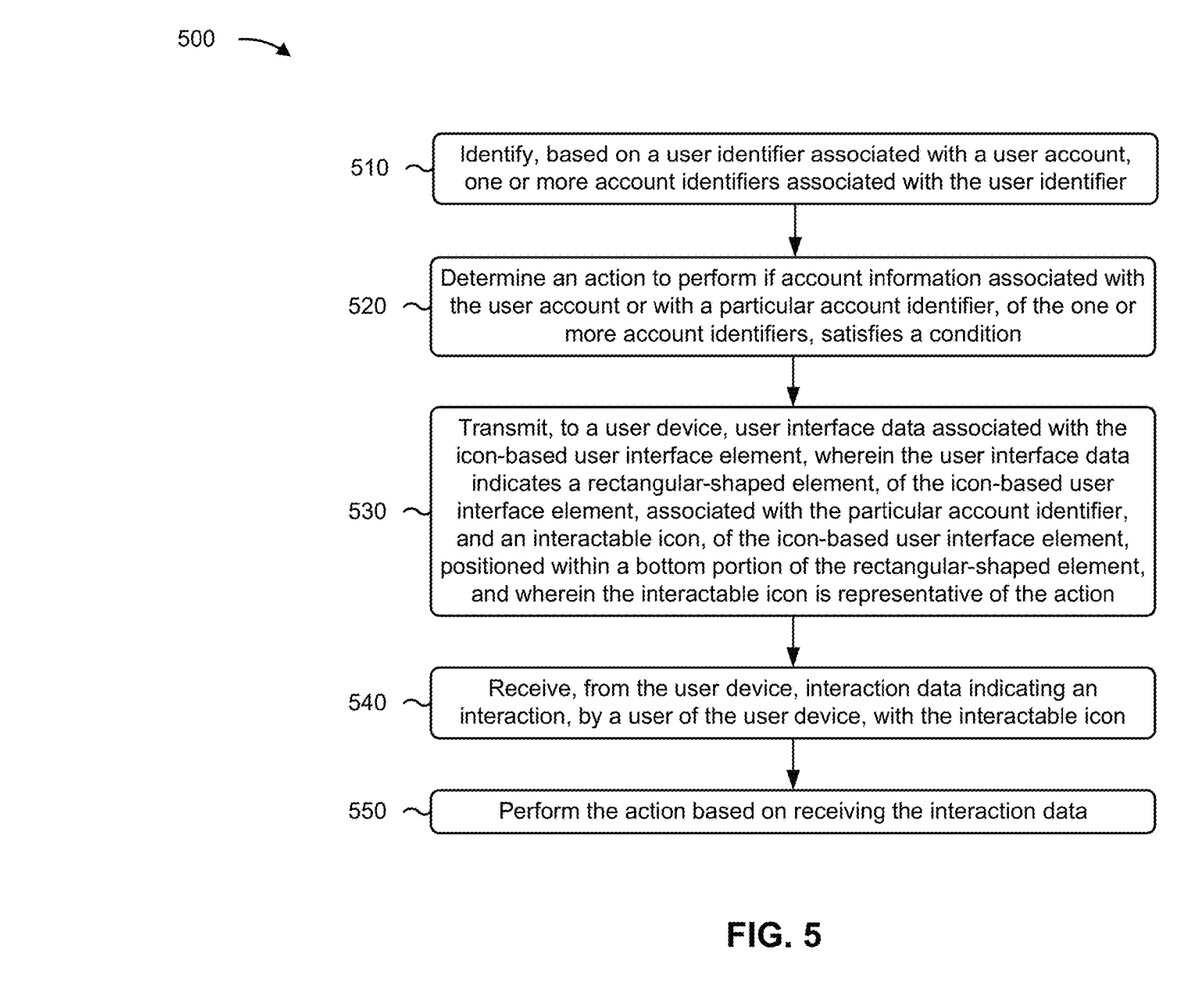
FIGS. 5-6 are flowcharts of example processes relating to presentation and control of user interaction with an icon-based user interface element.

FIG. 5 is a flowchart of an example process 500 associated with presentation and control of user interaction with an icon-based user interface element. In some implementations, one or more process blocks of FIG. 5 may be performed by a system (e.g., processing system 310). In some implementations, one or more process blocks of FIG. 5 may be performed by another device or a group of devices separate from or including the system, such as user device 330. Additionally, or alternatively, one or more process blocks of FIG. 5 may be performed by one or more components of device 400, such as processor 420, memory 430, input component 440, output component 450, and/or communication component 460.

As shown in FIG. 5, process 500 may include identifying, based on a user identifier associated with a user account, one or more account identifiers associated with the user identifier, wherein the one or more account identifiers correspond to one or more account types (block 510). As further shown in FIG. 5, process 500 may include determining an action to perform if account information associated with the user account or with a particular account identifier, of the one or more account identifiers, satisfies a condition (block 520). As further shown in FIG. 5, process 500 may include transmitting, to a user device, user interface data associated with the icon-based user interface element (block 530). The user interface data indicates a rectangular-shaped element, of the icon-based user interface element, associated with the particular account identifier, and an interactable icon, of the icon-based user interface element, positioned within a bottom portion of the rectangular-shaped element. The interactable icon is representative of the action. As further shown in FIG. 5, process 500 may include receiving, from the user device, interaction data indicating an interaction, by a user of the user device, with the interactable icon (block 540). As further shown in FIG. 5, process 500 may include performing the action based on receiving the interaction data (block 550).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 3-4.

Figure 6:
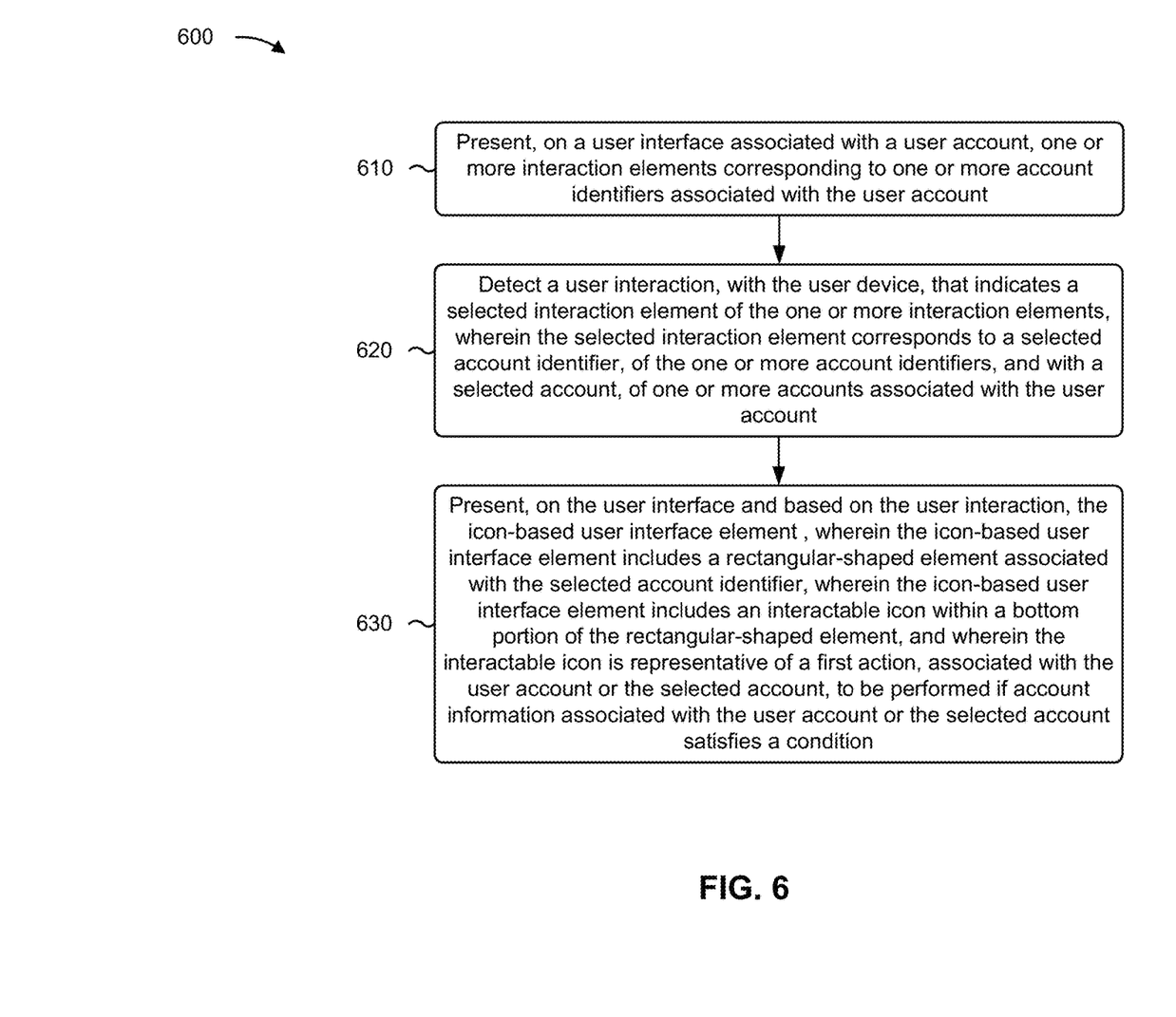

FIG. 6 is a flowchart of an example process 600 associated with presentation and control of user interaction with an icon-based user interface element. In some implementations, one or more process blocks of FIG. 6 may be performed by a user device (e.g., user device 330). In some implementations, one or more process blocks of FIG. 6 may be performed by another device or a group of devices separate from or including the user device, such as processing system 310. Additionally, or alternatively, one or more process blocks of FIG. 6 may be performed by one or more components of device 400, such as processor 420, memory 430, input component 440, output component 450, and/or communication component 460.

As shown in FIG. 6, process 600 may include presenting, on a user interface associated with a user account, one or more interaction elements corresponding to one or more account identifiers associated with the user account (block 610). As further shown in FIG. 6, process 600 may include detecting a user interaction, with the user device, that indicates a selected interaction element of the one or more interaction elements, wherein the selected interaction element corresponds to a selected account identifier, of the one or more account identifiers, and with a selected account, of one or more accounts associated with the user account (block 620). As further shown in FIG. 6, process 600 may include presenting, on the user interface and based on the user interaction, the icon-based user interface element (block 630). The icon-based user interface element includes a rectangular-shaped element associated with the selected account identifier. The icon-based user interface element includes an interactable icon within a bottom portion of the rectangular-shaped element. The interactable icon is representative of a first action, associated with the user account or the selected account, to be performed if account information associated with the user account or the selected account satisfies a condition.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 3-4.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for providing data for presentation of an icon-based user interface element, the system comprising:
   one or more memories; and
   one or more processors, communicatively coupled to the one or more memories, configured to:
      identify, based on a user identifier associated with a user account, one or more account identifiers associated with the user identifier,
         wherein the one or more account identifiers correspond to one or more account types associated with one or more accounts that include the user account;
      determine, based on assigning a weight value to a plurality of factors associated with the one or more account identifiers, a rank associated with each of the one or more accounts,
         wherein the plurality of factors include an alert, an account balance, an impending action date, and an account type, and
         wherein each of the plurality of factors is assigned a particular weight value that is different from each other;
      determine, based on the rank, a primary account and a particular account identifier, of the one or more account identifiers, associated with the primary account;
      determine, based on determining that account information associated with the user account or with the particular account identifier satisfies a condition, a set of actions to perform associated with the user account;
      transmit, to a user device, user interface data associated with the icon-based user interface element;
         wherein the user interface data indicates a rectangular-shaped element, of the icon-based user interface element, associated with the particular account identifier or the user identifier, and a set of interactable icons associated with the set of actions to perform, of the icon-based user interface element, positioned within the rectangular-shaped element, and wherein the set of interactable icons are representative of the set of actions;
      receive, from the user device, interaction data indicating an interaction, by a user of the user device, with the set of interactable icons; and
      perform an action based of the set of actions on receiving the interaction data.

2. The system of claim 1, wherein, to determine the action, the one or more processors are configured to:
   identify another available account type, of a plurality of account types, that differs from the one or more account types corresponding to the one or more account identifiers associated with the user identifier,
   wherein the action includes:
      initiating a sign-up process for signing up the user for the other available account type, and
      transmitting, to the user device, sign-up information associated with the sign-up process.

3. The system of claim 1, wherein, to determine the action, the one or more processors are configured to:
  determine that a required action associated with the particular account identifier has an action date within a threshold time frame,
    wherein the action includes performing the required action.
4. The system of claim 1, wherein, to determine the action, the one or more processors are configured to:
  identify a fraud alert associated with the particular account identifier,
    wherein the action is to lock an account associated with the particular account identifier.
5. The system of claim 4, wherein an interactable icon of the set of interactable icons is associated with a process related to a fraud alter and a lock symbol.
6. The system of claim 1, wherein the one or more processors are further configured to:
  transmit, to the user device and with the user interface data, action information descriptive of the action to be performed.
7. The system of claim 1, wherein a first number of the set of interactable icons correspond to a second number of the set of actions to perform.
8. The system of claim 1, wherein each of the set of interactable icons correspond to a different action of the set of actions to perform.
9. A method for providing data for presenting an icon-based user interface element, comprising:
  identifying, by a system, a plurality of account identifiers associated with a user account of a user;
  determining, by the system and based on assigning a weight value to a plurality of factors associated with the one or more account identifiers, a rank associated with each of the one or more accounts,
    wherein the plurality of factors include an alert, an account balance, an impending action date, and an account type, and
    wherein each of the plurality of factors is assigned a particular weight value that is different from each other;
  determining, by the system and based on the rank, a primary account and a primary account identifier, of the one or more account identifiers, associated with the primary account;
  determining, by the system, the primary account identifier that has an importance level greater than respective importance levels of other account identifiers, of the plurality of account identifiers, based on one or more factors;
  determining, by the system, a set of actions to perform associated with the user account, based on determining that account information associated with the user account or with the primary account identifier satisfies a condition; and
  transmitting, by the system and to a user device, a first set of user interface data indicating a plurality of user interface elements corresponding to the plurality of account identifiers, wherein a primary user interface element, of the plurality of user interface elements, corresponds to the primary account identifier,
    wherein the first set of user interface data indicates a rectangular-shaped element, of the primary user interface element, and a set of interactable icons representative of the set of actions to perform, positioned within the rectangular-shaped element; and
    wherein the set of interactable icons are representative of an action of the set of actions.
10. The method of claim 9, further comprising:
  receiving, from the user device, interaction data indicating an interaction, by the user, with the set of interactable icons; and
  performing the action based on receiving the interaction data.
11. The method of claim 9, wherein the plurality of account identifiers correspond to a plurality of account types, and wherein determining the action comprises:
  identifying an available account type, of a plurality of available account types, that differs from the plurality of account types corresponding to the plurality of account identifiers,
    wherein the action includes:
      initiating a sign-up process for signing up for the available account type, and
      transmitting, to the user device, sign-up information associated with the sign-up process.
12. The method of claim 9, wherein a first number of the set of interactable icons correspond to a second number of the set of actions to perform.
13. The method of claim 9, wherein each of the set of interactable icons correspond to a different action of the set of actions to perform.
14. A user device configured to present an icon-based user interface element, comprising:
  a memory; and
  one or more processors, communicatively coupled to the memory, configured to:
    identify, based on a user identifier associated with a user account, one or more account identifiers associated with the user identifier,
      wherein the one or more account identifiers correspond to one or more account types associated with one or more accounts that include the user account;
    determine, based on assigning a weight value to a plurality of factors associated with the one or more account identifiers, a rank associated with each of one or more accounts associated with a use of the user account and including the user account,
      wherein the plurality of factors include an alert, an account balance, an impending action date, and an account type, and
      wherein each of the plurality of factors is assigned a particular weight value that is different from each other;
    determine, based on the rank, a primary account and a particular account identifier, of the one or more account identifiers, associated with the primary account;
    determine, based on determining that account information associated with the user account or with the particular account identifier satisfies a condition, a set of actions to perform;
    generate, based on determining the set of actions to perform, one or more interaction elements corresponding to the set of actions to perform;
    detect a user interaction, with the user device, that indicates a selected interaction element of the one or more interaction elements; and
    present, on a user interface associated with the user account and based on the user interaction, the icon-based user interface element, wherein the icon-based user interface element includes a rectangular-shaped element associated with the particular account identifier, and wherein the icon-based user interface element includes an interactable icon, associated with each of a set of actions to perform, within the rectangular-shaped element.

15. The user device of claim 14, wherein the one or more processors are further configured to:

detect a second user interaction, with the user device, that indicates the interactable icon; and receive performance information associated with performance of the set of actions.

16. The user device of claim 15, wherein the one or more processors are further configured to:

present, on the user interface and based on the second user interaction, the performance information.

17. The user device of claim 14, wherein the icon-based user interface element includes action information descriptive of a first action of the set of actions to be performed, wherein the action information is located within the rectangular-shaped element, and wherein the icon-based user interface element is associated with performing one or more actions that corresponds to the set of actions.

18. The user device of claim 14, wherein the icon-based user interface element includes a second interactable icon within the rectangular-shaped element, wherein the second interactable icon is representative of a second action of the set of actions different from a first action of the set of actions.

19. The user device of claim 14, wherein a first number of the one or more interaction elements correspond to a second number of the set of actions to perform.

20. The user device of claim 14, wherein an interaction element of the one or more interaction elements are associated with locking an account related to the particular account identifier.

* * * * *